(12) United States Patent
Hashiguchi et al.

(10) Patent No.: US 9,147,256 B2
(45) Date of Patent: Sep. 29, 2015

(54) IMAGE PROCESSING APPARATUS AND IMAGE PROCESSING METHOD

(71) Applicant: CANON KABUSHIKI KAISHA, Tokyo (JP)

(72) Inventors: Noriyasu Hashiguchi, Kawasaki (JP); Yusuke Yachide, St. Leonard (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/248,606

(22) Filed: Apr. 9, 2014

(65) Prior Publication Data

US 2014/0314312 A1    Oct. 23, 2014

(30) Foreign Application Priority Data

Apr. 17, 2013   (JP) ................................ 2013-086912

(51) Int. Cl.
G06K 9/34    (2006.01)
G06T 7/00    (2006.01)

(52) U.S. Cl.
CPC ............. *G06T 7/0081* (2013.01); *G06T 7/0093* (2013.01); *G06T 2207/20141* (2013.01)

(58) Field of Classification Search
None
See application file for complete search history.

(56) References Cited

U.S. PATENT DOCUMENTS 5,825,909 A * 10/1998 Jang .............................. 382/132
6,771,834 B1 * 8/2004 Martins et al. ............... 382/257
2002/0063893 A1 * 5/2002 Fujieda ........................ 358/1.15
2012/0051650 A1 * 3/2012 Aisaka et al. ................. 382/195
2014/0314312 A1 * 10/2014 Hashiguchi et al. .......... 382/164

OTHER PUBLICATIONS

Comaniciu, et al., "Mean Shift: A Robust Approach toward Feature Space Analysis", IEEE Trans. Pattern Analysis and Machine Intelligence, vol. 24, No. 5, May 2002, pp. 603-619.
Achanta, et al., "SLIC Superpixels", EPFL Technical Report, No. 149300, Jun. 2010, pp. 1-16.
Vedaldi, et al., "Quick Shift and Kernel Methods for Mode Seeking", In Proceedings of the European Conference on Computer Vision (ECCV), 2008, pp. 1-14.
Shi, et al., "Normalized Cuts and Image Segmentation", IEEE Trans. Pattern Analysis and Machine Intelligence, vol. 22, No. 8, Aug. 2000, pp. 888-905.
Felzenszwalb, et al., "Efficient Graph-Based Image Segmentation", International Journal of Computer Vision, vol. 59, No. 2, Sep. 2004, pp. 1-26.

* cited by examiner

*Primary Examiner* — Sean Motsinger
(74) *Attorney, Agent, or Firm* — Carter DeLuca Farrell & Schmidt, LLP

(57) ABSTRACT

An edge graph in which a pixel of an image is set as a node and an edge is set between nodes is generated. The dissimilarity or similarity between nodes at the two ends of the edge is used as the feature amount of the edge, and the edge is classified into one of a plurality of classes based on the feature amount. The edge of interest is selected in ascending class order of the feature amount, and it is determined whether to merge determination target regions to which the nodes at the two ends of the edge of interest belong. Determination target regions determined to be able to be merged are merged, and a feature amount in the merged region is updated.

16 Claims, 11 Drawing Sheets

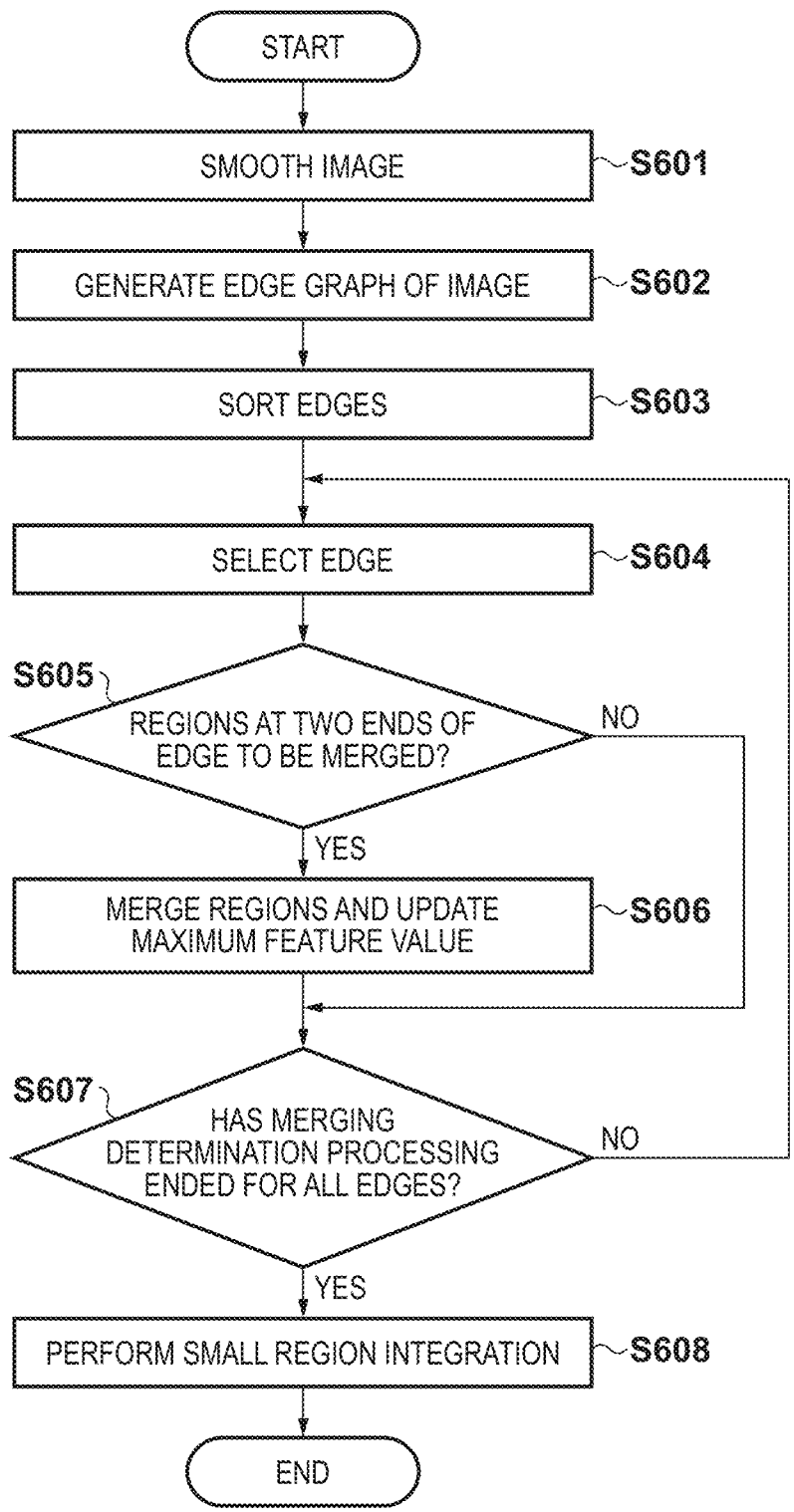

FIG. 8
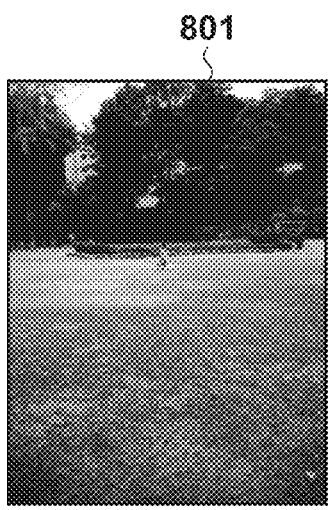
801
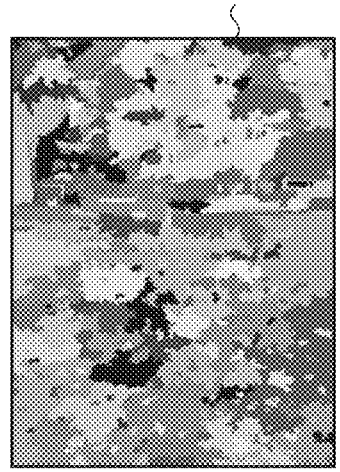
802
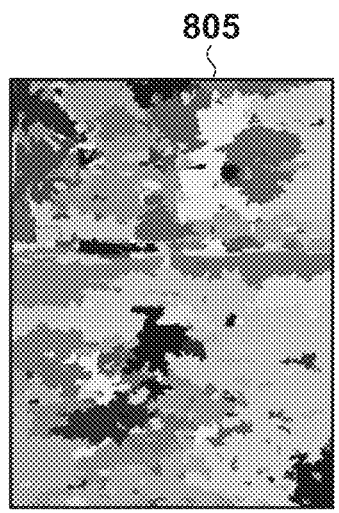
805
803
804

FIG. 9

| IMAGE | ALGORITHM | NUMBER OF SEGMENTED REGIONS |
|---|---|---|
| 802 | SORT | 424 |
| 803 | ROUGH SORT BY 128 BINS | 1155 |
| 804 | ROUGH SORT BY 1,024 BINS | 742 |
| 805 | • ROUGH SORT BY 128 BINS<br>• SETTING OF Int(C) | 377 |

IMAGE PROCESSING APPARATUS AND IMAGE PROCESSING METHOD

BACKGROUND OF THE INVENTION

1. Field of the Invention

The present invention relates to graph-based image segmentation processing.

2. Description of the Related Art

A region segmentation method is used as a technique for segmenting an image into a plurality of regions so that attributes such as color, pattern, and brightness become the same. The segmented regions can undergo encoding processing, and region recognition and identification for each segmented region. This can reduce the processing amount in comparison with image processing at the pixel level. Recently, it is becoming popular to perform image processing in a built-in device controlled by software. It is considered that even the built-in device can perform complicated image processing on a high-resolution image by executing image processing for each region after region segmentation.

Various methods have been proposed regarding region segmentation of an image. Literatures which present methods for clustering pixels to segment an image into regions are, for example, literatures 1, 2, and 3:

Literature 1: Dorin Comaniciu, Peter Meer, "Mean Shift: A Robust Approach toward Feature Space Analysis", IEEE Trans. Pattern Analysis and Machine Intelligence, Vol. 24, No. 5, pp. 603-619, 2002

Literature 2: Radhakrishna Achanta, Appu Shaji, Kevin Smith, Aurelien Lucchi, Pascal Fua, Sabine Susstrunk, "SLIC Superpixels", EPFL Technical Report, No. 149300, June 2010

Literature 3: Andrea Vedaldi, Stefano Soatto, "Quick Shift and Kernel Methods for Mode Seeking", In Proceedings of the European Conference on Computer Vision (ECCV), 2008

Literature 1 proposes a non-parametric feature space search method called mode-seeking. This search method is a method (Mean-shift method) of detecting local maximum positions at distribution densities for input points obtained by projecting pixels in an image to a predetermined feature space. The input points are connected to the detected local maximum positions to cluster pixels. This method is based on convergent calculation by iterative processing, and the total processing amount is large.

Literature 2 proposes a pixel clustering method based on mode-seeking, similar to literature 1, but adopts a method of moving a feature space to increase the kernel density estimation. Since this method is not convergent calculation, the processing amount is smaller than that in the Mean-shift method. However, the calculation amount is $O(n^2)$ proportional to almost the square of the number n of data, so the total processing amount is large.

Literature 3 proposes a method of distributing and arranging cluster centers serving as initial positions not to overlap edges in an image, and clustering pixels based on a k-mean method using the cluster centers as seeds to segment the image into regions. This method includes iterative processing, but the calculation amount is much smaller than those in the above-described methods. However, since the k-mean method needs to be executed between respective cluster centers, data of the entire image needs to be held for clustering. It is difficult to implement this method in a built-in device for which it is hard to ensure a large-capacity memory.

Unlike the above-mentioned region segmentation methods by clustering, literatures 4 and 5 present graph-based region segmentation methods in which pixels are set as nodes, adjacent pixels are connected to form an edge, and an image is handled as a graph to segment the image into regions:

Literature 4: Jianbo Shi, Jitendra Malik, "Normalized Cuts and Image Segmentation", IEEE Trans. PAMI, Vol. 22, No. 8, August 2000

Literature 5: Pedro F. Felzenszwalb, Daniel P. Huttenlocher, "Efficient Graph-Based Image Segmentation", International Journal of Computer Vision, Vol. 59, No. 2, September 2004

According to the method in literature 4, an edge having, as a feature amount, an affinity representing the similarity between nodes is set between nodes, and an edge to be cut for region segmentation is specified. To obtain the cut, the eigenvalue problem of a matrix representing the affinity needs to be solved, requiring a large calculation amount.

According to the method in literature 5, similar to literature 4, pixels are set as nodes, adjacent pixels are connected to form an edge, and the dissimilarity in color or the like between adjacent pixels is calculated as the feature amount of an edge. After calculating the feature amounts of all edges, the edges are sorted in the order of magnitude of the feature amount. In the order of sorted edges, it is determined whether to merge regions to which nodes, that is, pixels at the two ends of each edge belong. Regions determined to be merged are merged. The same merging determination processing is performed for all edges. At the end of the merging determination processing for all edges, the image has been segmented into a plurality of regions each having the same attributes. This method has features in which the calculation amount itself is smaller than those in the aforementioned methods, processing is possible at high speed, and the accuracy is high.

In the region segmentation method in literature 5, sort processing can reduce processing for searching for an edge having a maximum feature value in a region. The sort processing amount depends on the number of edges generated in an image to be processed. According to the method in literature 5, edges are generated between a pixel of interest and eight neighboring pixels. Therefore, time is taken to sort all edges.

Generally, sort processing is often executed as sequential processing, and it is hard to increase the speed of sort processing by hardware. Thus, when a built-in device performs image processing on a high-resolution image by using the method in literature 5, sort processing in region segmentation becomes a bottleneck.

SUMMARY OF THE INVENTION

In one aspect, an image processing apparatus for performing graph-based region segmentation processing, comprising: a generation unit configured to generate an edge graph in which a pixel of an image is set as a node and an edge is set between nodes; a classification unit configured to classify the edge into one of a plurality of classes based on a feature amount of the edge, wherein a dissimilarity or similarity between nodes at two ends of the edge is as the feature amount; a determination unit configured to select an edge of interest in ascending class order of the feature amount, and determine whether to merge determination target regions to which the nodes at the two ends of the edge of interest belong; and a merging unit configured to merge determination target regions determined to be able to be merged, and update a feature amount in the merged region.

According to the aspect, in a case where performing graph-based region segmentation processing, the load of edge sort processing is reduced.

Further features of the present invention will become apparent from the following description of exemplary embodiments with reference to the attached drawings.

BRIEF DESCRIPTION OF THE DRAWINGS

FIG. 6 is a flowchart showing region segmentation processing.

FIG. 8 is a view showing an example of a region segmentation result.

FIG. 9 is a table showing the number of segmented regions in each image of FIG. 8.

DESCRIPTION OF THE EMBODIMENTS

Figure 1:
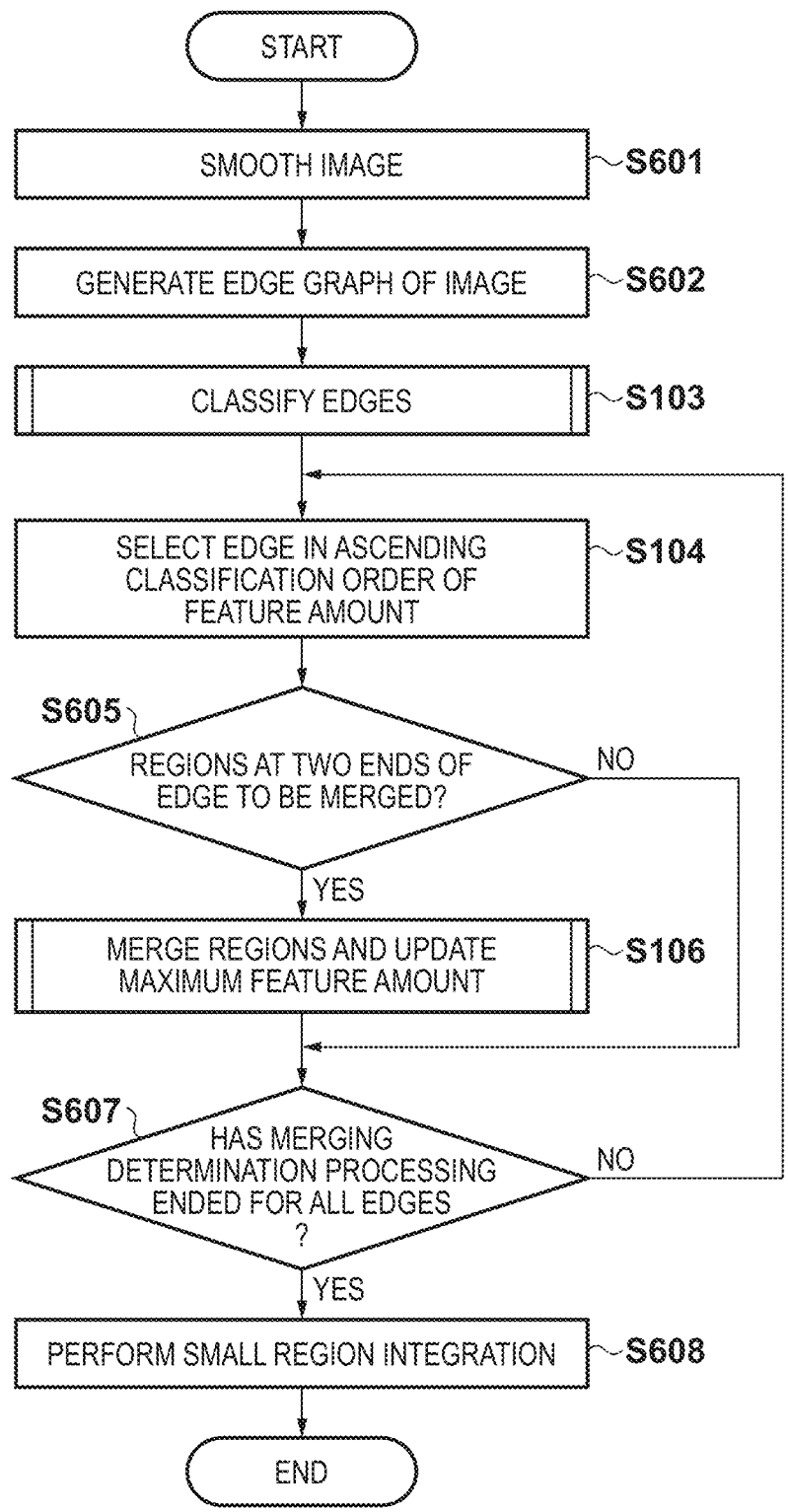
FIG. 1 is a flowchart showing region segmentation processing.

Embodiments of the present invention will now be described with reference to the accompanying drawings. It should be noted that the following embodiments are not intended to limit the scope of the appended claims, and that not all the combinations of features described in the embodiments are necessarily essential to the solving means of the present invention.

The present invention is directed to image processing in which, for example, an image photographed by a digital camera is input and segmented into regions. The image processing according to the present invention can be executed in, for example, a digital device such as a personal computer, smartphone, or tablet computer which handles an image photographed by a digital camera, or in a digital camera body.

First Embodiment

Region Segmentation Algorithm

A graph-based region segmentation algorithm as the premise of the present invention will be explained.

An image is defined as an undirected graph $G=(V, E)$ (V is a set of vertices, E is a set of branches each representing a pair of vertices). At this time, $v \in V$ represents a node corresponding to a pixel in the image, and $(v_i, v_j) \in E$ represents an edge connecting nodes corresponding to adjacent pixels. The weight of an edge is expressed as a feature amount $w\{(v_i, v_j)\}$ representing the dissimilarity between nodes. The feature amount $w\{(v_i, v)\}$ is defined as, for example, a Euclidean distance in the RGB color space, but is not limited to this. Letting C be a segmented region, a segmentation S which segments the graph node V is defined as $C \in S$.

Letting $MST(C, E)$ be the minimum spanning tree in the region $C \in E$, a maximum edge feature value $Int(C)$ in the region is defined by:

$$Int(C) = \max w(e) \quad (1)$$

where $e \in MST(C, E)$

Among edges connecting the nodes of two different regions $C_1 \in V$ and $C_2 \in V$, a minimum edge feature amount $Dif(C_1, C_2)$ is defined by:

$$Dif(C_1, C_2) = \min w\{(v_i, v_j)\} \quad (2)$$

where $v_i \in C_1$, $v_j \in C_2$, and $(v_i, v_j) \in E$.

A reference $D(C_1, C_2)$ for segmentation using equations (1) and (2) is defined as:

$$\text{if } ((Dif(C_1,C_2) > MInt(C_1,C_2)) D(C_1,C_2) = \text{true; else}$$
$$D(C_1,C_2) = \text{false;} \quad (3)$$

In expression (3), the value "true" means to separate two regions, and the value "false" means to merge two regions. $MInt(C_1, C_2)$ is given by:

$$MInt(C_1,C_2) = \min\{Int(C_1) + \tau(C_1), Int(C_2) + \tau(C_2)\} \quad (4)$$

where $\tau(C)$ is a function (threshold function) which functions as a threshold for controlling the easiness of merging of two different regions. $\tau(C)$ is defined by:

$$\tau(C) = k/|C| \quad (5)$$

where k is the parameter, and $|C|$ is the number of nodes in the region C that represents the size of the region C.

From the definition of equation (5), when the region C is small, the $\tau(C)$ value is large and the region C is easily merged. When the region C is large, $\tau(C)$ is small and the region C is hardly merged.

As described above, expression (3) is a region merging determination expression. For the two regions $C_1$ and $C_2$, whether these regions can be merged is determined in accordance with the result of comparison between $Dif(C_1, C_2)$ and $MInt(C_1, C_2)$. $Dif(C_1, C_2)$ representing a minimum edge feature value between two regions to undergo merging determination will be called a "minimum feature value between regions". $MInt(C_1, C_2)$ representing a smaller one of maximum edge feature values in the respective regions will be called a "maximum feature value in a region". According to expression (3), if $Dif(C_1, C_2) \leq MInt(C_1, C_2)$, the regions are merged; if $Dif(C_1, C_2) > MInt(C_1, C_2)$, the regions are not merged.

FIG. 6 is a flowchart showing the region segmentation algorithm.

First, an input image is smoothed (S601). For example, smoothing is performed by applying a Gaussian filter to the image and removing noise. Then, an edge graph between adjacent nodes is generated using respective pixels of the smoothed image as nodes (S602). In the initial state, a region in the image exists as each node, so the value of $Int(C)$ representing a maximum feature value between nodes in the region is 0.

Edges are sorted in ascending order of the dissimilarity between nodes (S603). An unprocessed edge having an edge feature amount w(e) corresponding to the minimum dissimilarity is selected from the sorted edges (S604). The edge having the edge feature amount w(e) is sometimes called an "edge w(e)".

After that, whether to merge two regions $C_1$ and $C_2$ to which nodes at the two ends of the selected edge belong is determined using expression (3) (S605). The regions to which nodes at the two ends of an edge belong are sometimes called "regions at the two ends of an edge". Also, regions at the two ends of an edge to undergo merging determination are sometimes called "determination target regions".

If it is determined to merge the determination target regions $C_1$ and $C_2$, the process advances to step S606. If it is determined not to merge the determination target regions $C_1$ and $C_2$, the process returns to step S604 through step S607, and advances to processing for the next edge.

If it is determined to merge the determination target regions $C_1$ and $C_2$, the determination target regions $C_1$ and $C_2$ are merged into a region $C_3$, and the maximum feature value $Int(C_3)$ in the region $C_3$ is updated to the edge feature amount w(e) of the selected edge (S606).

It is determined whether the merging determination processing has been performed for all edges generated in step S602 (S607). The processes in steps S604 to S606 are repeated until the merging determination processing ends for all the edges.

If the merging determination processing ends for all the edges, "small region integration", which is processing of integrating small regions generated by noise, a fine pattern, or the like in an image, is performed (S608). The small region integration is processing of checking the sizes of all regions generated by region segmentation and merging a region of a predetermined size or smaller to a neighboring region. The regions obtained by the small region integration are final region segmentation results.

The feature of the region segmentation algorithm is merging determination processing based on the edge sort order. In step S604, if an edge w(e) is selected in the sort order and determination target regions $C_1$ and $C_2$ at the two ends of the selected edge are merged, the maximum feature value $Int(C_3)$ in the merged region $C_3$ is replaced with w(e). This processing is premised on that edges are sorted in ascending order of the dissimilarity and then unprocessed edges are selected in ascending order of the dissimilarity. That is, this processing utilizes the fact that the feature amount w(e) of a currently selected edge is always larger than the maximum feature values $Int(C_1)$ and $Int(C_2)$ in two regions at the two ends of the edge. Thus, when determining whether to merge determination target regions at the two ends of a selected edge, processing of searching for the maximum feature value $Int(C_1)$ in the region $C_1$ and the maximum feature value $Int(C_2)$ in the region $C_2$ can be reduced.

However, the sort processing amount depends on the number of edges generated from a processing target image. For example, when the processing target image has a VGA size of 640×480 pixels, if edges are generated between a pixel of interest and eight neighboring pixels, as many as 1,228,800 (=640×480×4) edges are generated, and these edges need to be sorted. In general, when quick sort is performed for the number n of data, the average calculation time is $O(n \log n)$, and the longest calculation time is $O(n^2)$. When the clock frequency is 100 MHz and the time taken for quick sort of 1,228,800 edges is estimated, an average time of about 75 ms and a longest time of about 15 s are required.

To solve this, rough sort is performed to classify edges in an image in accordance with their feature amounts, reducing the load of sort processing while maintaining the region segmentation accuracy, details of which will be described later.

[Apparatus Arrangement]

Figure 2:
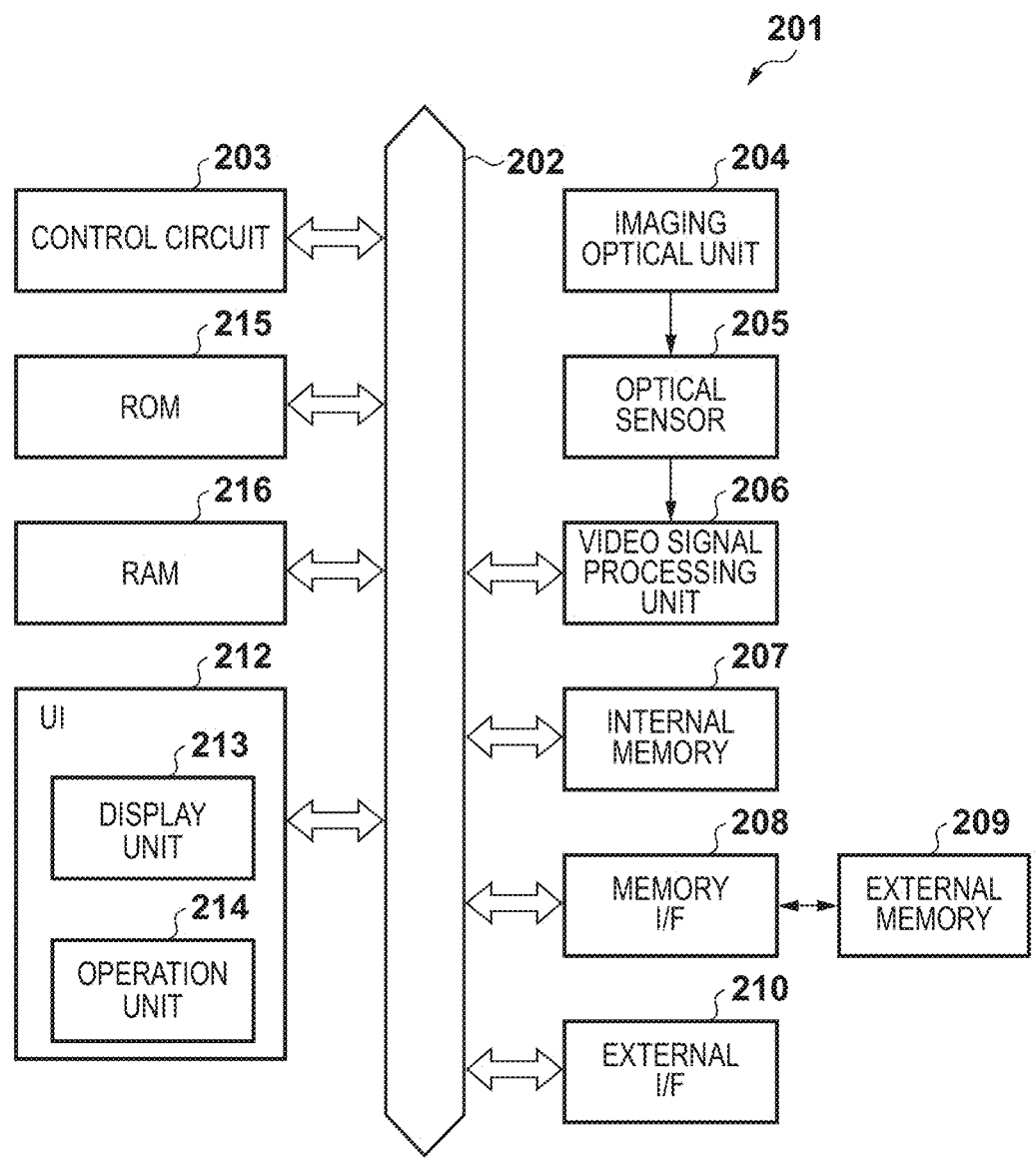
FIG. 2 is a block diagram showing the arrangement of a digital camera.

FIG. 2 shows the arrangement of a digital camera 201 including an image processing apparatus according to the embodiment.

In FIG. 2, respective building components are connected to each other through a system bus 202, and perform various processes such as imaging processing, save of an obtained image, and external output of an obtained image under the control of a control circuit 203.

An imaging optical unit 204 includes a photographing lens and the like, and converges light traveling from an imaging target (object). Although not shown, the imaging optical unit 204 includes a stop mechanism for adjusting the exposure amount in accordance with the brightness of light in photography, and a shutter mechanism for adjusting the exposure amount in accordance with the exposure time. A flash or the like can also be arranged for photography at night or in a dark place in association with the imaging optical unit 204.

An optical sensor 205 includes a light receiving element array such as a charge coupled device (CCD) or CMOS, and a driving circuit. The optical sensor 205 converts the light converged by the imaging optical unit 204 into an electrical signal corresponding to the light intensity. A video signal processing unit 206 generates a digital image by digitizing the electrical signal which has been output from the optical sensor 205 and represents the video.

The digital image generated by the video signal processing unit 206 is transferred through the system bus 202 to an internal memory 207 such as a random access memory (RAM), or an external memory 209 such as a memory card connected to a memory interface (I/F) 208.

An external I/F 210 includes a serial bus connector such as a USB (Universal Serial Bus). The external I/F 210 transfers image data stored in the internal memory 207 or external memory 209 to an external device such as a digital device. As the external I/F 210, an interface for a wireless network is also usable.

As a user interface (UI) 212, the digital camera 201 also includes a display unit 213, and an operation unit 214 including arrow keys, buttons, and a touch panel. The display unit 213 is constructed by, for example, a liquid crystal screen and also functions as a viewfinder. In addition, the display unit 213 displays an image read out from the internal memory 207 or external memory 209, or provides an operation screen for setting imaging conditions and the like.

The control circuit 203 includes a microprocessor (CPU), and controls the overall operation of the digital camera 201 by executing a predetermined processing operation in accordance with program codes stored in a read only memory (ROM) 215. The control circuit 203 temporarily writes, in a random access memory (RAM) 216 serving as a work memory, system variables and environment variables at the time of the processing.

Figure 3:
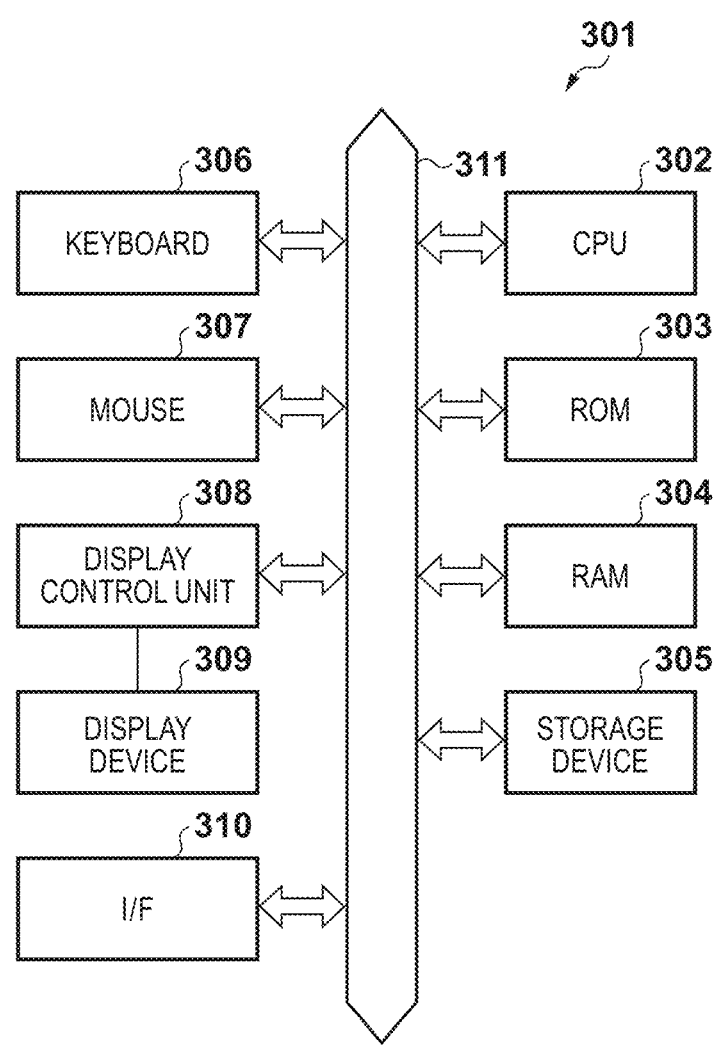
FIG. 3 is a block diagram showing the arrangement of a digital device.

FIG. 3 is a block diagram showing the arrangement of a digital device 301 functioning as the image processing apparatus according to the embodiment.

In FIG. 3, a CPU 302 is activated according to a boot program or BIOS (Basic Input/Output System) stored in a ROM 303. By using a RAM 304 as a work area, the CPU 302 executes an OS (Operating System) stored in a storage device 305, and controls the overall system through a system bus 311.

The storage device 305 is a storage unit such as a hard disk drive (HDD) or solid state drive (SSD) which stores an application program for generating region segmentation information, in addition to the OS, and various data including image data to undergo region segmentation processing.

A keyboard 306 and mouse 307 are input units for inputting a user instruction. A display control unit 308 includes a video memory and video controller. The display control unit 308 outputs a video signal to a display device 309 such as a liquid crystal display (LCD) to display an image containing a UI on the display device 309. Note that the digital device 301 may include a touch panel constituted by integrating a display device and input unit, like a smartphone or tablet computer.

An I/F 310 is an interface for a wired or wireless network or an interface such as a USB for a serial bus in order to communicate with various external devices. Various data in the digital device 301 are exchanged through the system bus 311.

[Region Segmentation Processing]

Region segmentation processing is implemented by, for example, executing program codes loaded from the ROM 215 by the control circuit 203 shown in FIG. 2. The control circuit 203 loads a digital image generated by the video signal processing unit 206 based on a video signal obtained by the imaging optical unit 204 and optical sensor 205, and starts region segmentation processing. When an image processing circuit for performing region segmentation processing is included in the video signal processing unit 206, the video signal processing unit 206 performs region segmentation processing. The control circuit 203 stores, in the internal memory 207 or external memory 209, region segmentation data obtained by region segmentation processing, and displays it as an image segmentation result on the display unit 213. The region segmentation data can also be used for another image processing in the control circuit 203 or video signal processing unit 206.

The digital device 301 shown in FIG. 3 may execute region segmentation processing. For example, the CPU 302 of the digital device 301 activates an application program for generating region segmentation information stored in the storage device 305, and executes region segmentation processing on a digital image input through the I/F 310 or a digital image stored in the storage device 305. Region segmentation information as the result of region segmentation processing is displayed on the display device 309 and held in the storage device 305.

Region segmentation processing will be explained with reference to the flowchart of FIG. 1. A feature amount (edge weight) representing, for example, the dissimilarity between nodes at the two ends of an edge will be called an "edge feature amount". The same reference numerals as those in region segmentation processing shown in FIG. 6 denote the same processes, and a detailed description thereof will not be repeated in some cases.

After an edge graph is generated in step S602, rough sort of edges is performed to classify all edges in the edge graph into a plurality of feature amount ranges (bins) in accordance with the weight (edge feature amount) (S103).

Assume that the possible range of the edge feature amount is 0 to R−1, the number of bins is B, and edges are classified into bin 0 to bin B−1 in ascending order of the edge feature amount. Note that the edge feature amount ranges of the respective bins have an equal width. In other words, edge feature amount ranges are assigned to the respective bins at an R/B interval.

Figure 4:
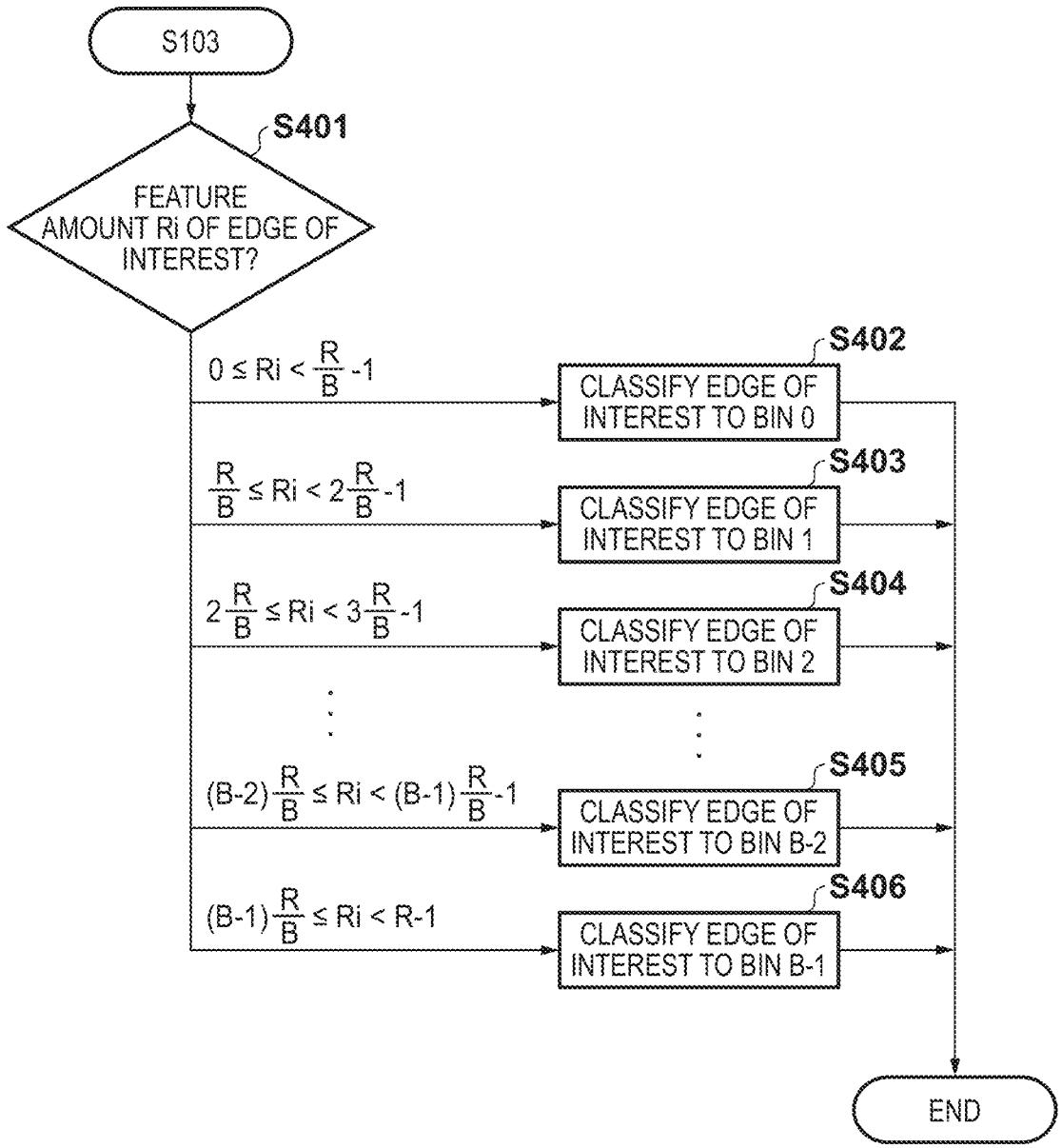
FIG. 4 is a flowchart showing edge classification processing.

In this case, classification into each bin is performed as shown in the flowchart of FIG. 4. An edge feature amount R is determined (S401), and the edge is classified into a bin corresponding to the edge feature amount R (S402 to S406). For example, if the feature amount Ri of the edge of interest falls within a range of 0 to R/B−1, the edge of interest is classified into bin 0 in step S402. Similarly, if the feature amount Ri of the edge of interest falls within a range of R/B−1 to 2R/B−1, the edge of interest is classified into bin 1 in step S403.

In this manner, multi-stage classification is executed in accordance with the edge feature amount. An edge having an edge feature amount within a maximum range of (B−1)R/B to R−1 is classified into bin B−1 in step S406. In the processing of step S103, an edge contained in the edge graph is classified into a bin corresponding to its edge feature amount. Note that edges are classified into the respective bins in random order.

Then, an edge w(e) of interest to undergo merging determination processing is selected (S104). The edge selection is repeated till the end of selecting all edges. Edges are selected at random in ascending classification order of the feature amount from an unprocessed edge classified into a corresponding feature amount range. More specifically, first, an edge classified into bin 0 is selected. After the end of selecting all edges in bin 0, an edge classified into bin 1 is selected. After the end of repeating edge selection, all edges classified into all bins were selected as the edge of interest.

Thereafter, merging determination processing (S605) using expression (3) is performed. If it is determined not to merge the determination target regions $C_1$ and $C_2$, it is determined whether the merging determination processing has been performed for all edges generated in step S602 (S607). If there is an unprocessed edge, the process returns to step S104 to select the next edge of interest.

If it is determined in step S605 to merge the determination target regions $C_1$ and $C_2$, the regions $C_1$ and $C_2$ are merged to generate a region $C_3$ (S106). At this time, a maximum feature value $Int(C_3)$ in the region $C_3$ is updated according to setting processing shown in the flowchart of FIG. 5.

Figure 5:
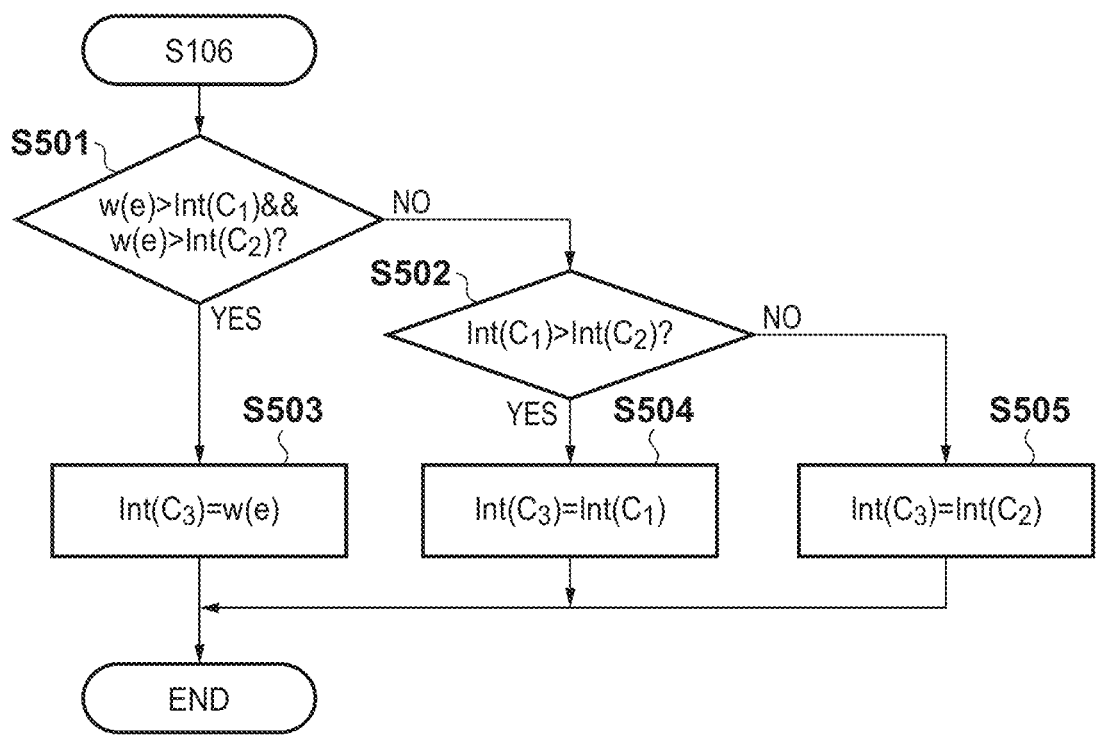
FIG. 5 is a flowchart showing processing of setting a maximum feature value in a region.

In the setting processing shown in FIG. 5, the feature amount w(e) of the edge of interest is compared with the maximum feature values $Int(C_1)$ and $Int(C_2)$ in the determination target regions $C_1$ and $C_2$ (S501). If $w(e)>Int(C_1)$ and $w(e)>Int(C_2)$, $Int(C_3)$ is updated to $Int(C_2)=w(e)$. If $w(e)≥Int(C_1)$ or $w(e)≤Int(C_2)$, $Int(C_1)$ and $Int(C_2)$ are compared (S502). If $Int(C_1)>Int(C_2)$, $Int(C_2)$ is updated to $Int(C_2)=Int(C_1)$ (S504). If $Int(C_1)≤Int(C_2)$, $Int(C_2)$ is updated to $Int(C_2)=Int(C_2)$ (S505). That is, in step S106, a feature amount of a maximum value among w(e), $Int(C_1)$, and $Int(C_2)$ is set as the maximum feature value $Int(C_3)$ in the region $C_3$ generated by merging the regions $C_1$ and $C_2$.

After that, determination in step S607 is performed. If it is determined that merging determination processing has ended for all edges, small region integration (S608) is performed. A region obtained by the small region integration serves as a final region segmentation result.

In this way, to shorten the processing time taken to sort edges, edges are roughly sorted by the processing (S103) of classifying edges based on the edge feature amount.

When performing accurate sort processing of edges, the time taken for the sort processing is proportional to the number of edges connecting pixels. As the image size increases, the number of edges increases and the time taken for the sort processing increases. To the contrary, the rough sort processing (S103) of classifying edges based on the edge feature amount can shorten the processing time in comparison with the accurate sort processing. The processing time of the classification processing (S103) shown in FIG. 4 is O(n) with respect to the number n of edges and is much shorter than the average calculation time O(n log n) of the sort processing.

Edges classified into the respective bins have not been sorted by only the rough sort processing (S103). Thus, if the maximum feature value $Int(C_3)$ in the region is simply updated by the feature amount w(e) of the edge of interest, as in the update processing of step S606, the region segmentation accuracy degrades. This is because the region segmentation result by the graph-based region segmentation method sensitively reacts to the edge sort order and varies. The degradation of the region segmentation accuracy is therefore suppressed by updating $Int(C_3)$ to a maximum value among $w(e)$, $Int(C_1)$, and $Int(C_2)$ by the setting processing shown in FIG. 5.

[Comparison of Region Segmentation Algorithm]

The graph-based region segmentation algorithm decides a final segmented region by repeating region merging of the region $C_1$ to which a given node $N_1$ belongs and the region $C_2$ to which a node $N_2$ at the other end of an edge having the node $N_1$ as one end belongs, until it is determined that merging is impossible in the merging determination processing based on expression (3).

Figure 7A:
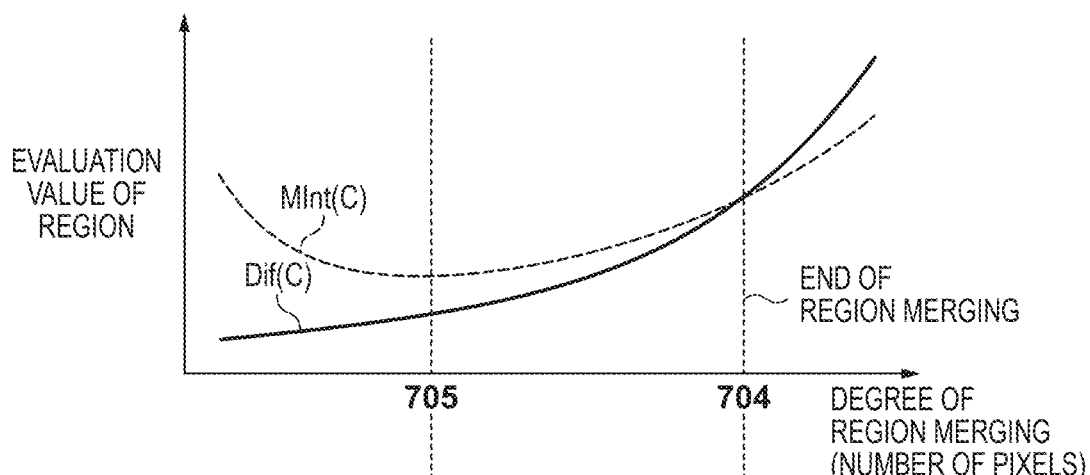
FIGS. 7A to 7C are graphs showing transition of region merging of a region of interest.
Figure 7B:
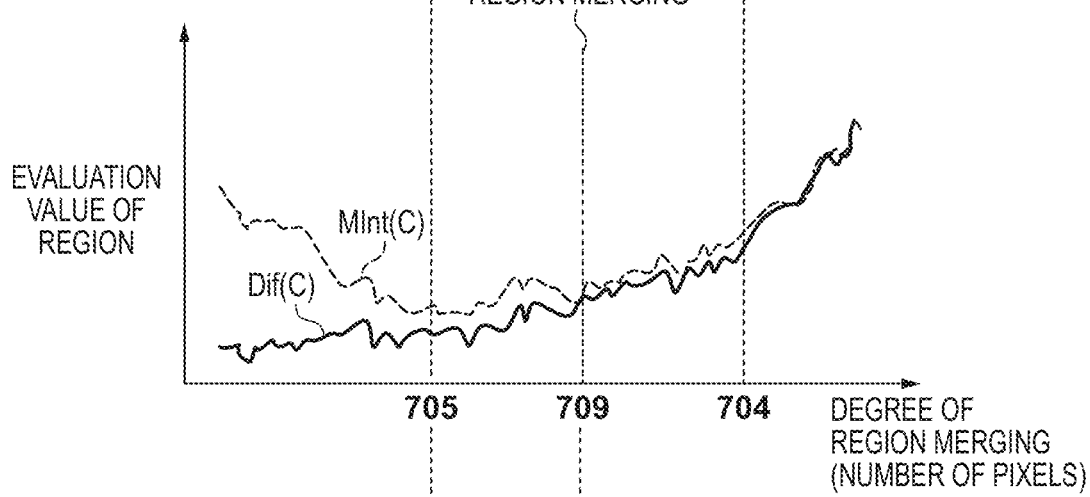
Figure 7C:
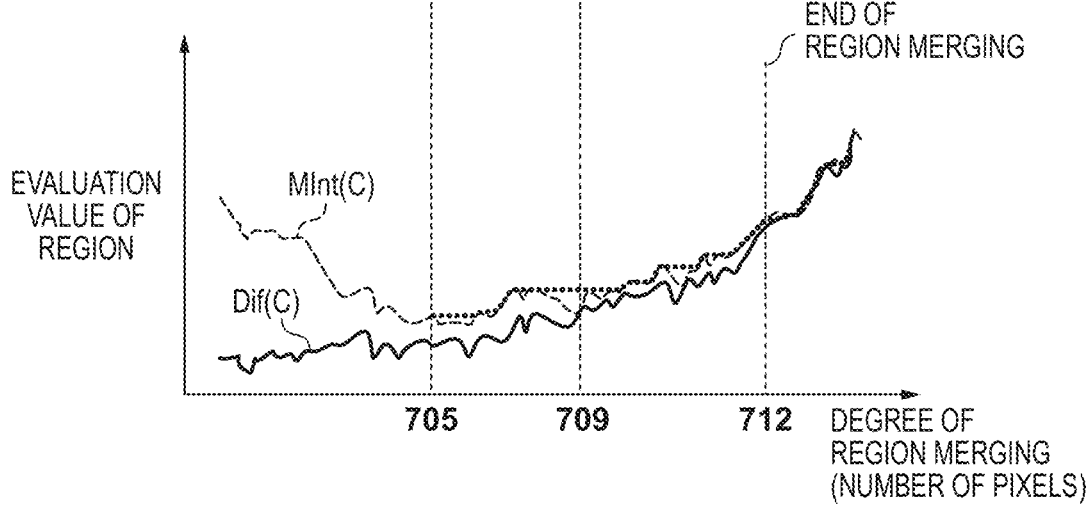

FIGS. 7A to 7C are graphs showing examples of transition of region merging of the region C of interest. The region segmentation algorithm is different between the examples of FIGS. 7A to 7C.

According to merging determination expression (3), whether the regions $C_1$ and $C_2$ can be merged is determined in accordance with the comparison result between the minimum feature value $Dif(C_1, C_2)$ between the regions $C_1$ and $C_2$, and the maximum feature value $MInt(C_1, C_2)$ in the region. Here, a case in which region merging is repeated for the region C of interest will be examined. In the following description, the maximum feature value in the region is regarded as the maximum feature value $MInt(C)=Int(C)+\tau(C)$ in the region C of interest. In the following description, $Dif(C)$ also represents the minimum feature value between the region C of interest and a region to be merged.

In the graphs shown in FIGS. 7A to 7C, the ordinate indicates the evaluation values (minimum feature value between regions and maximum feature value in a region) of a region to undergo merge determination. The abscissa indicates the degree of region merging by the number of pixels, and indicates that the region size is larger rightward along the abscissa.

Region Segmentation Algorithm Shown in FIG. 6

The graph shown in FIG. 7A represents changes of $Dif(C)$ and $MInt(C)$ in the region segmentation algorithm shown in FIG. 6 in which region merging is performed after performing accurate sort processing. In FIG. 7A, a solid curve indicates the minimum feature value $Dif(C)$ between the regions. Since edges are accurately sorted, the solid curve exhibits a monotonic increase in which $Dif(C)$ increases as the region C of interest grows.

In FIG. 7A, a dashed curve indicates the maximum feature value $MInt(C)$ in the region. In $MInt(C)$, when the region C of interest is small, $\tau(c)$ dependent on the initial parameter k represented in equation (5) is dominant. As the region C of interest grows, the degree of dependence on $\tau(C)$ drops. After the $\tau(C)$ value becomes sufficiently small, the influence of $Int(C)$ becomes dominant near, for example, a degree 705, and $MInt(C)$ turns to increase and changes along $Dif(C)$. In the example of FIG. 7A, $Dif(C)>MInt(C)$ at a degree 704. At this time, the determination result in expression (3) becomes "true", region merging to the region C of interest stops, and the region C of interest is provisionally determined as a segmented region before small region integration.

Modification of Region Segmentation Algorithm Shown in FIG. 1

The graph shown in FIG. 7B represents changes of $Dif(C)$ and $MInt(C)$ when edges are classified by the region segmentation algorithm shown in FIG. 1 and region merging is performed to simply update, by the edge feature amount $w(e)$, the maximum feature value $Int(C)$ in the region C of interest after region merging. That is, the graph represents an algorithm in which only the processing of step S106 in FIG. 1 is replaced with the processing of step S606 in FIG. 6. In other words, this is a modified algorithm of performing processing to simply update, to the edge feature amount $w(e)$, the maximum feature value $Int(C)$ in the region C of interest after region merging without complying with the setting processing of FIG. 5.

In FIG. 7B, a solid curve indicates the minimum feature value $Dif(C)$ between the regions. In this case, edges classified into bins have been sorted not accurately but in random order. Thus, $Dif(C)$ does not exhibit a monotonic increase, unlike FIG. 7A.

In FIG. 7B, a dashed curve 708 indicates the maximum feature value $MInt(C)$ in the region. In $MInt(C)$, when the region C of interest is small, $\tau(C)$ dependent on the initial value is dominant. As the region C of interest grows, the degree of dependence on $\tau(C)$ drops. After the $\tau(C)$ value becomes sufficiently small, the influence of $Int(C)$ becomes dominant near, for example, the degree 705, and $MInt(C)$ turns to increase. However, the transition of $MInt(C)$ in FIG. 7B differs from that in FIG. 7A. This difference arises from a change of $MInt(C)$ depending on a change of $Dif(C)$ because selected edges have not been sorted accurately in FIG. 7B.

When edges are sorted accurately as in FIG. 7A, region merging to the region C of interest ends at the degree 704 at which $Dif(C)>MInt(C)$, and the region C of interest is provisionally determined. When edges are classified as in FIG. 7B and the maximum feature value $Int(C)$ in the region C of interest after region merging is simply updated by the edge feature amount $w(e)$, $Dif(C)>MInt(C)$ may be obtained in a stage (for example, a degree 709) before the degree 704. In this case, compared to the case of FIG. 7A, before the region C of interest grows sufficiently, that is, remains small, region merging may end to provisionally determine the region C of interest, and over-segmentation may occur to unnecessarily segment an image.

Region Segmentation Algorithm Shown in FIG. 1

The graph shown in FIG. 7C represents changes of $Dif(C)$ and $MInt(C)$ in the region segmentation algorithm shown in FIG. 1. In FIG. 7C, a solid curve indicates the minimum feature value $Dif(C)$ between the regions. A dotted curve indicates the maximum feature value $MInt(C)$ in the region. A dashed curve is a copy of the dotted curve in FIG. 7B added for comparison, and indicates a maximum feature value $MInt(C)'$ in the region in the modified algorithm.

Even in FIG. 7C, as well as FIG. 7B, the influence of $\tau(C)$ is dominant before the vicinity of the degree 705, so $MInt(C)$ exhibits almost the same change as that of $MInt(C)'$ (a dotted curve up to the degree 705 is not plotted because the change is almost the same). After the vicinity of the degree 705, the influence of $Int(C)$ becomes dominant. Hence, $MInt(C)$ changes as indicated by the dotted curve by updating the maximum feature value $Int(C)$ in the region C of interest after region merging by the setting processing shown in FIG. 5. This is because $Int(C)$ remains maximum by the setting processing of FIG. 5. Therefore, over-segmentation as in the modified algorithm of FIG. 7B is prevented. The region C of interest is provisionally determined at a degree 712 near the end degree 704 of region merging in FIG. 7A, and the region segmentation accuracy is maintained to be almost equal to that in the algorithm of FIG. 6.

In the above-described example, $Int(C)$ remains maximum, but the present invention is not limited to this example. For example, a value corresponding to a maximum value may be applied to $Int(C)$ such that $Int(C)$ is maintained at a second largest value, or a value calculated by performing predetermined calculation on a maximum value is applied to $Int(C)$.

Example of Region Segmentation

FIG. 8 shows an example of a region segmentation result. An image 801 is an input image to undergo region segmentation processing. An image 802 is an image representing a region segmentation result by the algorithm in FIG. 6 using sort processing.

Images 803 and 804 are images representing region segmentation results by the modified algorithm using rough sort in which the numbers of bins are 128 and 1,024, respectively. Each region is smaller in the image 803 for which the number of bins is smaller, and the image is segmented more excessively. This is because the feature amount ranges of edges classified into the respective bins are large and edges classified into the respective bins are handled in random order.

An image 805 is an image representing a region segmentation result by the algorithm in FIG. 1 using rough sort in which the number of bins is 128.

FIG. 9 shows the number of segmented regions in each image of FIG. 8. Since the number of segmented regions of the image 802 is 424 and that of segmented regions of the image 805 is 377, these images have almost the same region segmentation count. In contrast, the numbers of segmented regions of the images 803 and 804 are 1,155 for 128 bins and 742 for 1,024 bins, and are much larger than those of the images 802 and 805. More specifically, the images 803 and 804 are in the over-segmentation state, compared to the images 802 and 805.

As described above, in graph-based region segmentation processing, the region segmentation accuracy can be maintained while simplifying sort processing and reducing the processing load by classifying edges.

Second Embodiment

The second embodiment according to the present invention will be described.

In rough sort according to the first embodiment, edge feature amount ranges are assigned to respective bins at an equal width. In equal-width assignment, if the number of bins is small, no appropriate region segmentation result may be obtained, details of which will be described later. The second embodiment will explain an example in which edge feature amount ranges assigned to respective bins are variable. Note that the arrangement of an image processing apparatus in the second embodiment is the same as that in the first embodiment, and a description thereof will not be repeated.

[Influence of Small Number of Bins and Equal-Width Assignment]

Figure 10A:
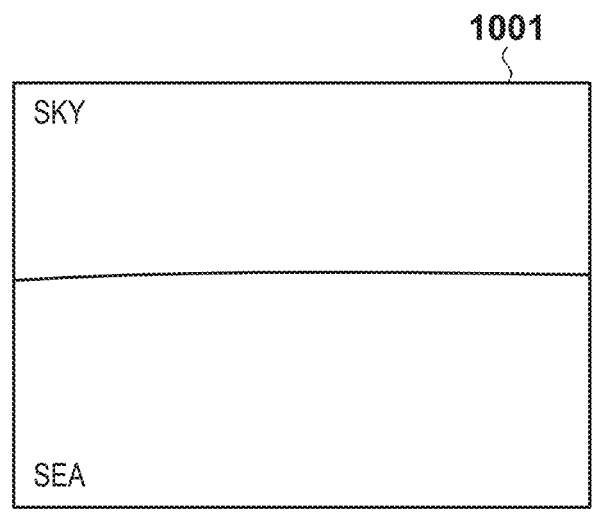
FIGS. 10A to 10C are views for explaining the influence of a small number of bins and equal-width assignment.

FIG. 10A shows an input image 1001 which captures the sky and sea. Since each of the sky region and sea region has a flat color, the change of the edge feature amount is small. To the contrary, the edge feature amount of a boundary portion between the sky and the sea is larger than the edge feature amount of each region. In some cases, however, the sky and sea are photographed in very similar colors depending on photographing conditions. If the sky and sea resemble each other in color, the difference between the edge feature amount of each region and that of the boundary portion becomes small.

Figure 10B:
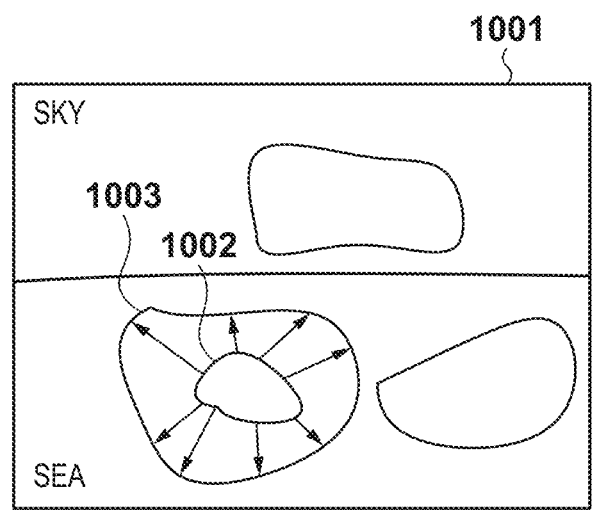

FIG. 10B shows the growth of a region when region segmentation processing is performed on the input image 1001 according to the region segmentation algorithm in FIG. 6 in which accurate sort processing of edges is performed.

According to the region segmentation algorithm in FIG. 6, merging of pixels or regions is performed in ascending order of the edge feature amount, so the region grows in each of the sky region and sea region. As merging of regions proceeds, for example, a region 1002 grows to a region 1003 in the sea region. This is because the edge feature amount of the boundary portion is larger than that of each region even if the difference is small, and merging processing of the boundary portion is performed finally.

When regions grow in the respective sea and sky regions, the edge feature amount of the boundary portion is evaluated finally. At this time, since the respective regions have become satisfactorily large, the values of threshold functions $\tau(C_1)$ and $\tau(C_2)$ for deciding a maximum feature value $MInt(C_1, C_2)$ in the region have become sufficiently small. It is therefore considered that $MInt(C_1, C_2)=\min\{Int(C_1), Int(C_2)\}$ indicates almost the maximum edge feature value in either region. If there is even a small difference between the edge feature amount of each region and that of the boundary portion, $Dif(C_1, C_2) > MInt(C_1, C_2)$. Thus, "true" is determined in merging determination expression (3), and it is determined not to merge the regions. That is, the sky region and sea region are segmented appropriately.

Figure 10C:
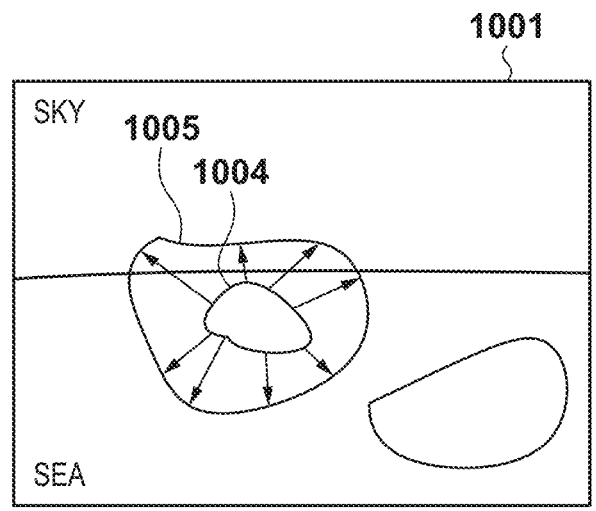

FIG. 10C shows the growth of a region when region segmentation processing is performed on the input image 1001 according to the region segmentation algorithm in FIG. 1 in which rough sort is performed.

When classifying edges by rough sort, if the difference between the feature amount of the edge of the sky region or sea region in the input image 1001 and the feature amount of the edge of the boundary portion is small, these edges may be classified into the same bin. As the number of bins is smaller, the assignment range of each bin becomes wider, and edges which should be originally classified are highly likely to be classified into the same bin.

FIG. 10C shows the growth of a region when the edge of the boundary portion and the edge of each region are classified into the same bin. In this case, when the region is still small, the edge feature amount of the boundary portion is highly likely to be evaluated. For example, when the evaluation target reaches the edge of the boundary portion while a region 1004 grows to a region 1005, the value of the threshold function $\tau(C)$ is large because the region is small. Since $MInt(C_1, C_2) > Dif(C_1, C_2)$, "false" is determined in merging determination expression (3), merging does not stop at the boundary portion, and the region keeps growing. As a result, the sky region and sea region are not segmented properly, as shown in FIG. 10C.

In this fashion, in region segmentation processing using rough sort, when the difference between the feature amount of the edge of a region and the feature amount of the edge of a boundary portion is small, these edges may be classified into the same bin, failing in obtaining an appropriate region segmentation result. This problem becomes conspicuous especially when the number of bins is small.

Although the influence of rough sort on a portion having a small edge feature amount has been described, no proper region segmentation result may be obtained even at a portion having a large edge feature amount. However, the portion having a large edge feature amount is hardly influenced by the threshold function $\tau(C)$ even if the region size is small. It can be considered that the influence of rough sort is smaller than that at a portion having a small edge feature amount.

The second embodiment solves this problem without increasing the number of bins. More specifically, a narrow feature amount range is assigned to a bin to which an edge having a small feature amount is classified, and a wide feature amount range is assigned to a bin to which an edge having a large feature amount is classified. By this assignment of the feature amount range, the edge of the sky region or sea region in the input image 1001 is less likely to be classified into the same bin, and a satisfactory region segmentation result is obtained.

[Region Segmentation Processing]

Region segmentation processing in the second embodiment will be explained. The region segmentation processing in the second embodiment is almost the same as the processing shown in FIG. 1 except for details of edge classification processing in step S103.

Figure 11:
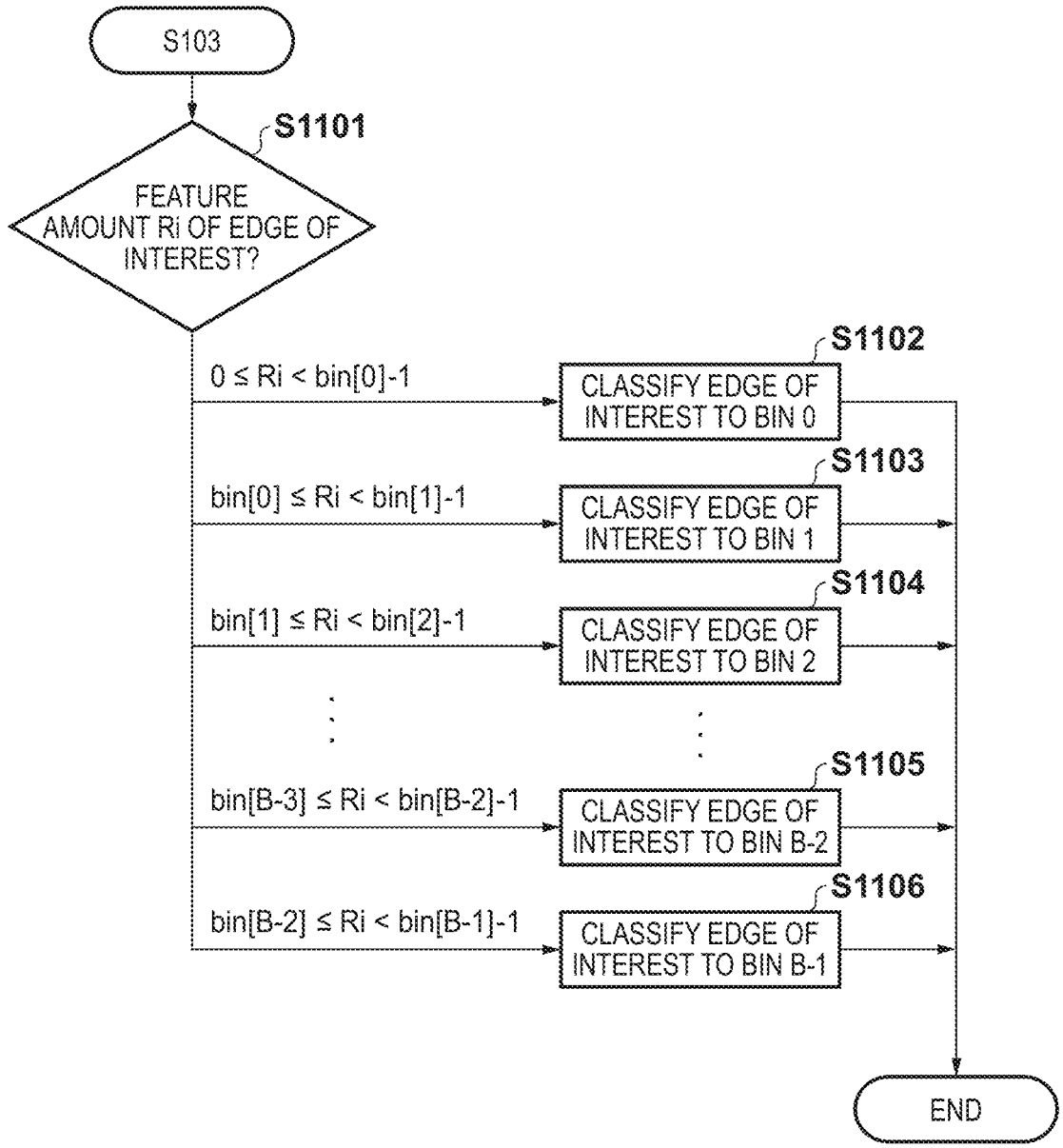
FIG. 11 is a flowchart showing another example of edge classification processing.

The edge classification processing (S103) according to the second embodiment is shown in the flowchart of FIG. 11. Values each corresponding to the lower limit of an edge feature amount classified into each bin are set in advance in variables bin[0] to bin[B−1] shown in FIG. 11. At this time, the values of the variables bin[0] to bin[B−1] are set so that the feature amount assignment range of bin 0 becomes minimum and the feature amount assignment range of bin B−1 becomes maximum.

In FIG. 11, an edge feature amount R is determined (S1101), and an edge is classified into a bin corresponding to the edge feature amount R (S1102-S1106). For example, if the feature amount Ri of the edge of interest falls within a range of 0 to bin[0]−1, the edge of interest is classified into bin 0 in step S1102. Similarly, if the feature amount Ri of the edge of interest falls within a range of bin[0] to bin[1]−1, the edge of interest is classified into bin 1 in step S1103.

In this way, multi-stage classification is executed in accordance with the edge feature amount. An edge having an edge feature amount in a maximum range of bin[B−2] to bin[B−1]−1 is classified into bin B−1 in step S1106. Note that edges are classified into the respective bins in random order.

As described above, since bin[0] to bin[B−1] are handled as variables, the feature amount assignment range of each bin can be set so that the feature amount assignment range of bin 0 becomes minimum and the feature amount assignment range of bin B−1 becomes maximum. Without increasing the number of bins, it is set to narrow the feature amount assignment range for a bin to which an edge having a small feature amount is classified. As a result, classification of the edge of a region to be segmented and the edge of a boundary portion into the same bin can be suppressed, obtaining a satisfactory region segmentation result.

Modification of Embodiments

The above-described embodiments have described an example in which an edge is classified by comparing the edge feature amount with the feature amount range, as in the flowchart shown in FIG. 4 or 11. The edge classification can be speeded up by using, for example, a look-up table (LUT). More specifically, it suffices to acquire the bin number of a classification destination from an edge feature amount by looking up the LUT.

The above-described embodiments have described an example in which an edge is classified into a bin as a method of simplifying sort of edges. However, any simple sort method is applicable as long as a rough sort result of classifying edges into a plurality of classes based on feature amount ranges is obtained.

The edge feature amount is not limited to the Euclidean distance between nodes in the RGB color space. Another feature amount such as the color difference between nodes in the CIELab space or the difference in texture amount is also usable. As the edge feature amount, the weight based on the dissimilarity between nodes is applied. However, even when the similarity between nodes is used, the processing is essentially the same as that when the dissimilarity is used. More specifically, a value representing the degree of similarity between regions is used as an edge feature amount. This can be coped with by reversing the evaluation order of the edge feature amount, the direction of the inequality of the evaluation equation, and the like in the above-described embodiments.

The above-described embodiments have described that edges connect a pixel of interest and eight neighboring pixels. However, even when an edge is generated between arbitrary pixels, edge feature amounts are evaluated in the order of rough sort. Accordingly, generation of over-segmentation can be suppressed to maintain the region segmentation accuracy.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-086912 filed Apr. 17, 2013 which is hereby incorporated by reference herein in its entirety.

What is claimed is:

1. An image processing apparatus for performing graph-based region segmentation processing, comprising:
 a generation unit configured to generate an edge graph in which a pixel of an image is set as a node and an edge is set between nodes;
 a classification unit configured to classify the edge into one of a plurality of classes based on a feature amount of the edge, wherein a dissimilarity or similarity between nodes at two ends of the edge is set as the feature amount;
 a determination unit configured to select an edge of interest in ascending class order of the feature amount, and determine whether to merge determination target regions to which the nodes at the two ends of the edge of interest belong; and
 a merging unit configured to merge determination target regions determined to be able to be merged, and update a feature amount in the merged region,
 wherein at least one of the generation unit, the classification unit, the determination unit, and the merging unit is implemented using a processor.

2. The apparatus according to claim 1, wherein the determination unit determines whether merging is possible, based on maximum feature amounts in the determination target regions and a minimum feature amount between the determination target regions.

3. The apparatus according to claim 2, wherein in a case where a smaller feature amount out of the maximum feature amounts in the respective determination target regions is smaller than the minimum feature amount between the determination target regions, the determination unit determines that the determination target regions cannot be merged.

4. The apparatus according to claim 2, wherein in a case where a smaller feature amount out of the maximum feature amounts in the respective determination target regions is not smaller than the minimum feature amount between the determination target regions, the determination unit determines that the determination target regions can be merged.

5. The apparatus according to claim 1, wherein the merging unit updates a maximum feature amount in the merged region.

6. The apparatus according to claim 5, wherein a largest feature amount among a feature amount of the edge of interest and maximum feature amounts in the respective determination target regions is set as the maximum feature amount in the merged region.

7. The apparatus according to claim 1, wherein the classification unit performs a classification using equal-width feature amount ranges.

8. The apparatus according to claim 1, wherein the classification unit performs a classification using variable feature amount ranges.

9. The apparatus according to claim 8, wherein each feature amount range is smaller as a feature amount of an edge to be classified is smaller.

10. The apparatus according to claim 1, wherein the feature amount is equivalent to a Euclidian distance between the nodes in a color space.

11. The apparatus according to claim 1, wherein the feature amount is equivalent to a color difference between the nodes.

12. The apparatus according to claim 1, wherein the feature amount is equivalent to a difference between texture amounts in the regions to which the nodes belong.

13. The apparatus according to claim 1, further comprising an integration unit configured to integrate a region of not larger than a predetermined size to a neighboring region after an end of selecting all edges contained in the edge graph and determining the merging.

14. An imaging device for photographing an image of an object, comprising an image processing apparatus defined in claim 1.

15. An image processing method of performing graph-based region segmentation processing, comprising:
using a processor to perform the steps of:
generating an edge graph in which a pixel of an image is set as a node and an edge is set between nodes;
classifying the edge into one of a plurality of classes based on a feature amount of the edge, wherein a dissimilarity or similarity between nodes at two ends of the edge is set as the feature amount;
selecting an edge of interest in ascending class order of the feature amount so as to determine whether to merge determination target regions to which the nodes at the two ends of the edge of interest belong;
merging determination target regions determined to be able to be merged; and
updating a feature amount in the merged region.

16. A non-transitory computer readable medium storing a computer-executable program for causing a computer to perform an image processing method of performing graph-based region segmentation processing, comprising:
using a processor to perform the steps of:
generating an edge graph in which a pixel of an image is set as a node and an edge is set between nodes;
classifying the edge into one of a plurality of classes based on a feature amount of the edge, wherein a dissimilarity or similarity between nodes at two ends of the edge is set as the feature amount;
selecting an edge of interest in ascending class order of the feature amount so as to determine whether to merge determination target regions to which the nodes at the two ends of the edge of interest belong;
merging determination target regions determined to be able to be merged; and
updating a feature amount in the merged region.

* * * * *